(12) United States Patent
Soulchin et al.

(10) Patent No.: US 8,350,845 B2
(45) Date of Patent: Jan. 8, 2013

(54) TRANSIT VIEW FOR A TRAFFIC REPORT (75) Inventors: Robert M. Soulchin, King of Prussia, PA (US); Stephen J. Reh, Philadelphia, PA (US)

(73) Assignee: Navteq North America, LLC, Chicago, IL (US)

( * ) Notice: Subject to any disclaimer, the term of this patent is extended or adjusted under 35 U.S.C. 154(b) by 852 days.

(21) Appl. No.: 12/351,985

(22) Filed: Jan. 12, 2009

(65) Prior Publication Data
US 2010/0177092 A1 Jul. 15, 2010

(51) Int. Cl.
*G06T 15/00* (2006.01)
*G09G 5/00* (2006.01)
*G06G 7/76* (2006.01)

(52) U.S. Cl. ........ 345/419; 345/629; 701/117; 701/118; 701/119; 701/120; 701/121; 701/122

(58) Field of Classification Search .......... 701/117–122; 345/419, 629
See application file for complete search history.

(56) References Cited

U.S. PATENT DOCUMENTS

| 6,681,174 | B1 * | 1/2004 | Harvey et al. ................. 701/117 |
| 7,116,326 | B2 | 10/2006 | Soulchin et al. .............. 345/440 |
| 7,188,057 | B2 * | 3/2007 | Birkelbach et al. ............... 703/7 |
| 7,953,548 | B2 * | 5/2011 | Vengroff et al. ............. 701/202 |
| 2004/0049341 | A1 * | 3/2004 | Fujiwara ....................... 701/210 |
| 2004/0059442 | A1 * | 3/2004 | Birkelbach et al. ............ 700/30 |
| 2004/0143385 | A1 | 7/2004 | Smyth et al. .................. 701/117 |
| 2005/0209769 | A1 * | 9/2005 | Yamashita et al. ............ 701/117 |
| 2006/0247850 | A1 * | 11/2006 | Cera et al. ..................... 701/208 |
| 2008/0183346 | A1 * | 7/2008 | Brown ............................ 701/21 |
| 2008/0238941 | A1 * | 10/2008 | Kinnan et al. ................ 345/630 |
| 2010/0020075 | A1 * | 1/2010 | Edecker et al. ............... 345/420 |

* cited by examiner

*Primary Examiner* — Jeffrey Chow (57) ABSTRACT

A method and system for visually displaying views of current transit conditions are disclosed. A user selects a transit system (e.g., bus, train, ferry) and a rundown of views of the transit system to show in a traffic report. To more easily identify the transit system in the traffic report, graphics representing the buildings and other landmarks in the geographic area of the transit system are displayed in x-ray mode, while the transit system graphics are highlighted using colors. Graphic objects are added to the views to provide additional information regarding the transit system, including information regarding incidents on the transit system.

19 Claims, 7 Drawing Sheets

TRANSIT VIEW FOR A TRAFFIC REPORT

FIELD

The present invention relates generally to traffic reports, and more specifically a transit view that can be used in visual traffic reports.

BACKGROUND

Most drivers have been impacted by traffic delays. Traffic delays are caused by one or more traffic incidents, such as congestion, construction, an accident, a special event (e.g., concerts, sporting events, festivals), a weather condition (e.g., rain, snow, tornado), and so on. Many television stations provide a traffic report in their news reports to provide viewers with information regarding current traffic conditions. Some television stations use graphics when presenting traffic information.

For example, U.S. Pat. No. 7,116,326, which is assigned to the same assignee of the present application, describes how a television station can display a traffic flow map that visually shows an animated graphic of the traffic conditions on one or more roadways in and around a metropolitan area. The traffic flow map is automatically generated from real or near real time traffic flow data, and changes as the actual, current traffic conditions change.

The television station may provide different views of the animated traffic flow. For example, U.S. Patent Publication No. 2006/0247850, which is assigned to the same assignee of the present application, describes three views: a two-dimensional (2D) overhead map, a Skyview map, and a three-dimensional (3D) fly-through map. The 2D overhead map depicts traffic conditions from the perspective of a viewer looking down at a map. The Skyview map is a 3D representation that includes buildings, terrain, and other landmarks. Similar to the 2D overhead map, the Skyview map depicts traffic conditions from the perspective of a viewer looking down at a map. The 3D fly-through map is a dynamic presentation of a 3D world detailing traffic conditions along a selected roadway or series of roadways.

While these views allow a user to more easily comprehend the current traffic conditions, there continues to be room for new features and improvements in providing traffic reports. One area for improvement is providing a view that depicts transit system conditions. Generally, transit systems include any mode of transportation in which a passenger does not operate his own vehicle. For example, transit systems include bus, rail, airline, and ferry systems. Transit systems typically transport passengers based on published schedules or at fixed intervals, usually charging set fares.

Transit systems can also experience delays due to accidents, mechanical problems, weather conditions, congestion, and so on. To inform viewers about current transit system conditions, a television station may provide a transit view in a traffic report. As a result, a viewer of the traffic report may be able to more easily evaluate current conditions on transit systems. Beneficially, the transit view may be added to a traffic report that also includes views regarding traffic conditions on roads.

SUMMARY

A method and system for displaying a transit view in a traffic report is disclosed. The transit view may be generated for any type of transit system, such as buses, trains, subways, water taxies, ferries, and so on. The transit view may be added to a traffic report that also includes views regarding traffic conditions on roads. For example, a television producer may select a series of views to include in a traffic report, which may be referred to as a "run down." An example run down may include a 2D overhead map of a road network, followed by a Skyview map of the road network, followed by a transit view of a subway system in the same geographic area as the road network. A viewer of the traffic report sees the current conditions of both the road network and the subway system in a single traffic report. Based on the traffic report, the viewer may decide to drive, take the subway, find alternative transportation (e.g., a bus), or wait for a better time to travel.

To generate the transit view, transit system graphics are added to the virtual road network. Additionally, the buildings and other landmarks in the virtual road network are modified so they can be displayed in "x-ray" mode. The transit view can also include static and/or dynamic objects to describe incidents on a transit system. Different camera views can be used to show the current conditions of a transit system.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
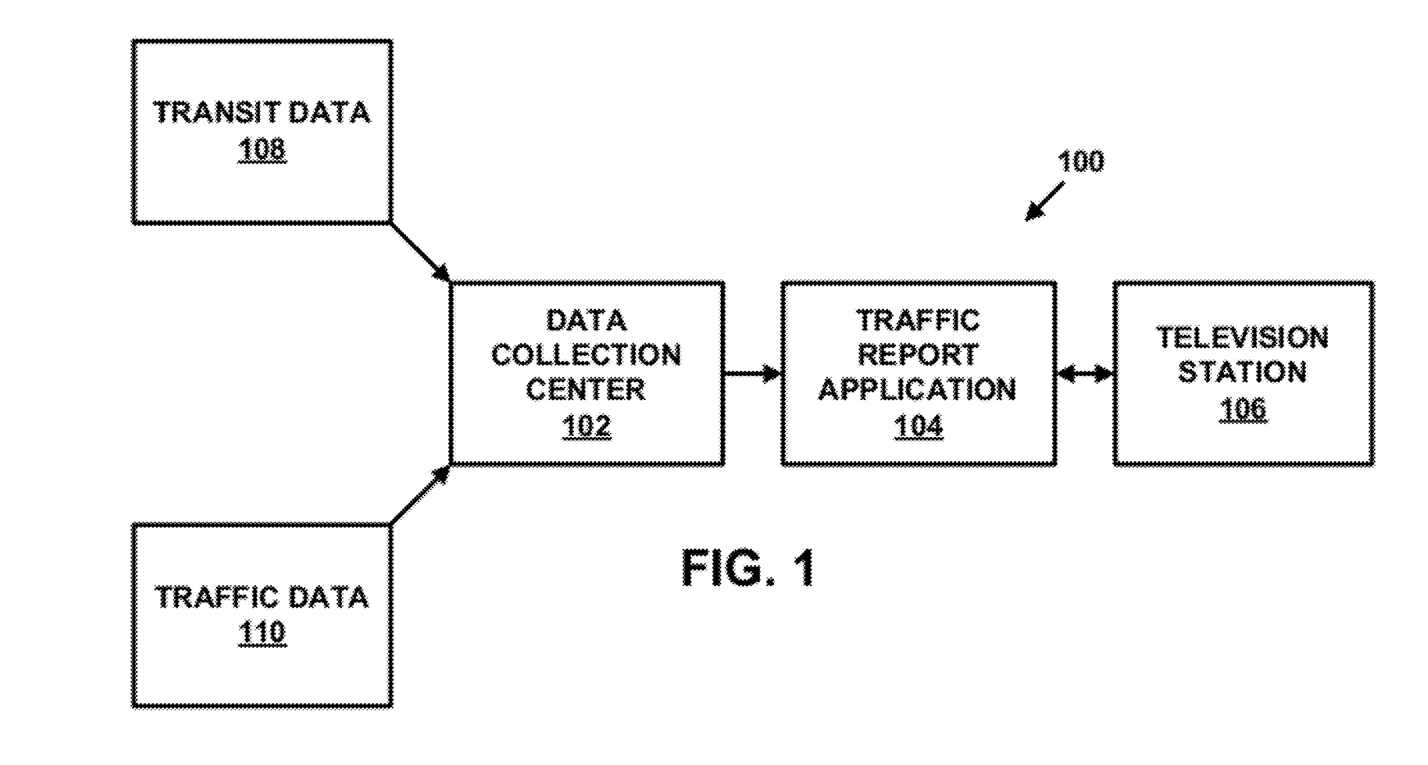
FIG. 1 is a block diagram of a system that may be used to display a transit view, according to an example.

FIG. 1 is a block diagram of a system 100 that may be used to display a transit view in a traffic report. The system 100 includes a data collection center 102 and a traffic report application 104. The data collection center 102 receives transit data 108 regarding transit conditions and provides a message to the traffic report application 104 that includes transit condition data. The data collection center 102 may also receive traffic data 110 regarding traffic conditions and provide a message to the traffic report application 104 that includes traffic condition data. A message from the data collection center 102 to the traffic report application 104 may include both transit and traffic condition data (i.e., same message includes both transit and traffic condition data). Alternatively, a message from the data collection center 102 to the traffic report application 104 may include only one of the transit and traffic condition data.

The traffic report application 104 uses the transit condition data along with user inputs to generate a video output that can be used by a television station 106 or other end user, such as a web-based or cellular-based application, to present information regarding current transit conditions to viewers. To provide a comprehensive traffic report (i.e., a traffic report with information regarding both traffic and transit conditions), the traffic report application 104 uses the transit condition data, the traffic condition data, and user inputs to generate a video output that can be used by a television station 106 or other end user to present information regarding current transit and traffic conditions to viewers.

The transit data 108 may be obtained from various transit agencies. For example, an operator may communicate with a transit agency on a frequent basis to obtain current conditions. Additionally, the transit agency may provide a live data feed to the data collection center 102. The operator may also monitor emergency scanner frequencies; call government departments of transportation, police, and emergency services; and obtain information regarding transit conditions from aircraft flying over the transit system.

The operator may enter the transit data 108 into a Traffic Incident Management System (TIMS), such as the TIMS described in U.S. Patent Publication No. 2004/0143385, which is assigned to the same assignee as the current application. U.S. Patent Publication No. 2004/0143385 is hereby incorporated by reference in its entirety. The operator may enter transit data using TIMS edit screens, which present the operator with a menu to select the type of information entered for a particular type of transit system and/or transit incident.

The transit data 108 may also be obtained using sensor data. The sensor data may be collected using sensors placed within the transit system. For example, a transit sensor may be installed in each bus, train, or ferry in a transit system. Additionally or alternatively, the sensors may be installed on or near a transit line in the transit system. The transit sensors may use one or more sensor technologies, such as radar, acoustics, video, cellular, and Global Positioning Satellite (GPS) technologies. Other methods of collecting transit data may also be used.

Similar to transit data, the traffic data 110 may obtained using operators and/or sensors. The operator may enter the traffic data 110 into the Traffic Incident Management System using the TIMS edit screens for a particular type of traffic incident. The sensor data may be collected from roadway sensors, such as radar, acoustics, video, and embedded loops in the roadway. For example, the sensor data may include speed, volume (number of vehicles passing the sensor per period of time), and density (percentage of the roadway that is occupied by vehicles). The sensor data may include other data types as well, such as vehicle classification (e.g., car, truck, motorcycle).

The traffic data 110 may also include probe data, which is point data collected from a moving vehicle having a device that can identify vehicle position as a vehicle travels along a road network. For example, the device may use cellular technology or Global Positioning Satellite (GPS) technology to monitor the vehicle's position on the road network. By monitoring the vehicle's movement, the probe data can be used to determine travel time, which can then be used to calculate speed of the vehicle.

The traffic data 110 may also include historical traffic data, which may include travel time, delay time, speed, and congestion data for various times of the day and days of the week. The traffic data collection center 102 may use the historical traffic data to predict clearance time for a traffic incident, to predict traffic conditions when sensor data, probe data, and/or event data is unavailable for a particular roadway, or for any other suitable purpose.

The traffic data collection center 102 includes a combination of hardware, software, and/or firmware that collects the transit data 108, analyzes the data 108, and provides a transit condition data output to applications that use transit data. The traffic data collection center 102 may also collect the traffic data 110, analyze the data 110, and provide a traffic condition data output to applications that use traffic data. For example, the traffic data collection center 102 may be a virtual geospatial traffic network (VGSTN) as described in U.S. Patent Publication No. 2004/0143385. Other systems for collecting, analyzing, and providing transit data in a format that can be used by applications may also be used.

The data collection center 102 maps the transit data 108 into a virtual world that includes buildings and other landmarks, transit networks, and road networks. Data representing the landmarks, transit networks, and road networks may be found in a geographic database. In one embodiment, the geographic database is a geographic database published by NAVTEQ North America, LLC of Chicago, Ill. Other sources of data may also be used to model the real world features in the virtual world. The virtual world may also include other objects that represent real world features (e.g., vehicles, traffic signals, environmental features) or provide additional transit information (e.g., text identifying train station names, travels times, delays).

The traffic data collection center 102 provides a transit condition data output to the traffic report application 104. The transit condition data output may be a data feed, such as an RSS or XML feed. The traffic data collection center 102 may also provide a traffic condition data output to the traffic report application 104. The traffic report application 104 uses the transit condition data output, user inputs, and optionally the traffic condition data output to create a video output for a traffic report that can be used by the television station 106. For example, the traffic report application 104 may be the NeXgen television traffic reporting application as described in U.S. Patent Publication No. 2006/0247850, which is hereby incorporated by reference in its entirety. Other applications that can create a traffic report using the transit condition data may also be used.

While the traffic report application 104 is depicted in FIG. 1 as a stand-alone entity, it is understood that the traffic report application 104 may be co-located with either the data collection center 102 or the television station 106. Additionally, the output from the traffic report application 104 may be provided to end users other than the television station 106. For example, the traffic report application 104 may provide an output to a web-based application or a cellular application.

Figure 2:
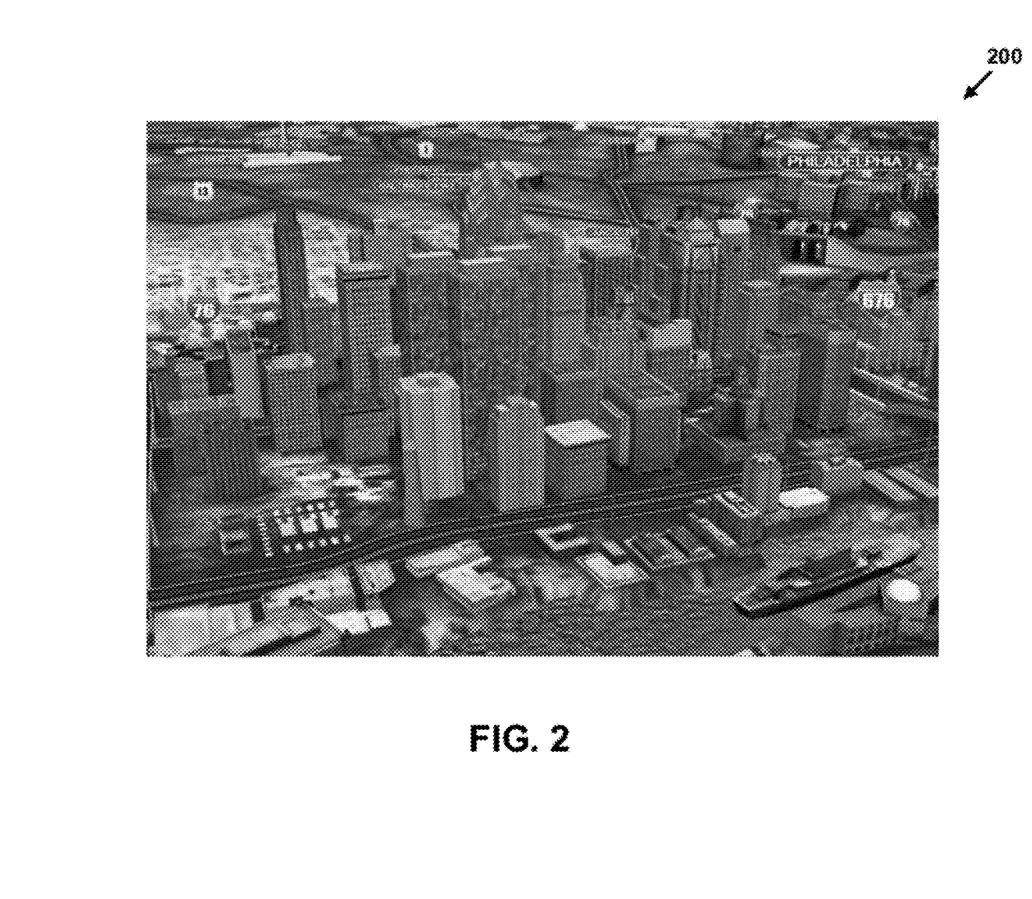
FIG. 2 is a screen shot depicting a city view, according to an example.

FIG. 2 is screen shot 200 depicting a view of a city. The screen shot 200 is an example of a single image from a traffic report that may be generated by the traffic report application 104 and presented by the television station 106. The city view depicts roads, water features, buildings, and text objects that identify the city and roads. While the city view may be helpful for depicting current traffic conditions and conditions for some types of transit systems, such as a bus system, the city view may obstruct the view of some transit networks. For example, the city view may obstruct the view of a subway transit system.

Figure 3:
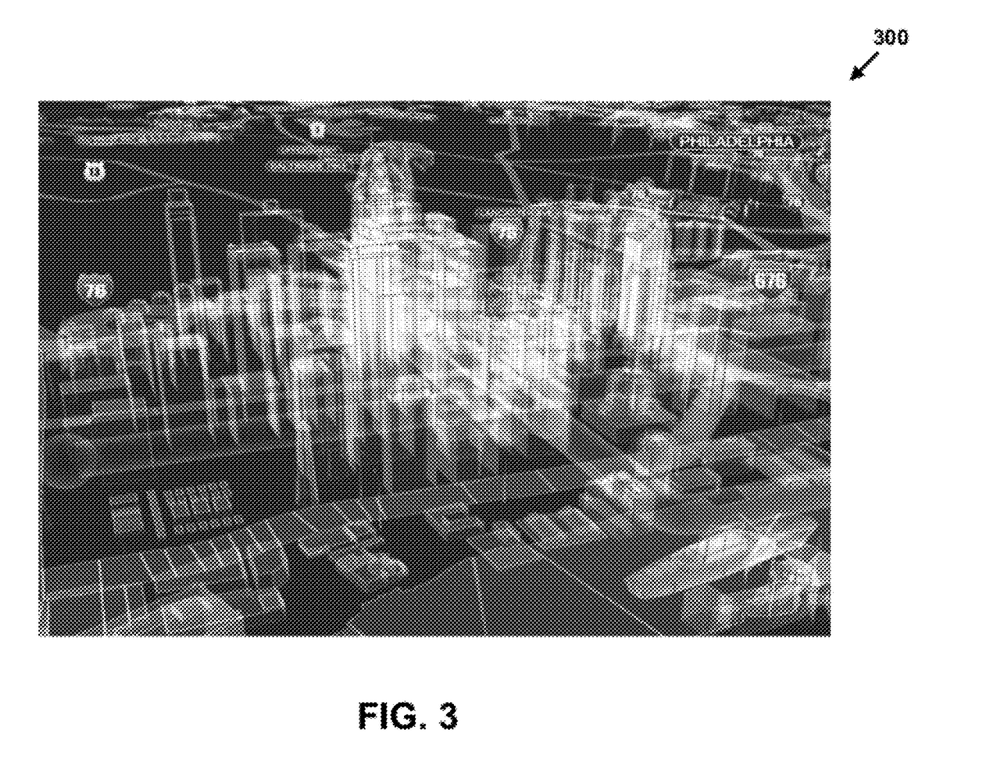
FIG. 3 is a screen shot depicting the city view of FIG. 2 in x-ray mode, according to an example.

FIG. 3 is a screen shot 300 depicting the city view of FIG. 2 in x-ray mode. In the x-ray mode, the buildings and other landmarks fade from the view, leaving behind a skeleton outline of these objects (i.e., shape remains). To create the city view, an artist uses a graphics application, such as commercially available Autodesk® 3ds Max®, to create the graphics. Another application, such as Gamebryo, may be used to create a runtime graphics data file (e.g., a .nif file) used by the traffic report application 104 to create the video output sent to the television station 106 or other end user.

To change to the x-ray mode of the city view, the artist changes the texture of the objects in the scene. The textures are the images applied to objects to make 3D geometry (e.g., boxes and rectangles) look like buildings. To generate the x-ray mode, the textures used to generate the city view of FIG. 1 are removed or changed to become more transparent. The artist may use an image editing program, such as Photoshop, to provide an alternate set of textures for the objects. The traffic report application 104 switches between sets of textures as appropriate for the view.

After or as the textures are altered to provide the x-ray mode, the transit system is emphasized in the view. The transit system is developed prior to running the traffic report application 104. Information regarding the transit system (i.e., travel locations, travel times, station information) may be obtained from transit agencies or other sources. Using this information, a transit layer is created and added to the 3D virtual world that includes other features in the same geographical area as the transit network.

Using a graphics application, the artist adds transit lines to a scene file. The scene file may have been previously developed for a road network. Preferably, the transit system objects are organized into a scene graph. A scene graph is a data structure commonly used by vector-based graphics editing applications. A scene graph is a collection of nodes in a graph or tree structure. A node may have many children but often only a single parent, with the effect of a parent apparent to all its child nodes. The nodes are enabled or disabled depending on whether they are to be included in a traffic report or not.

Figure 4:
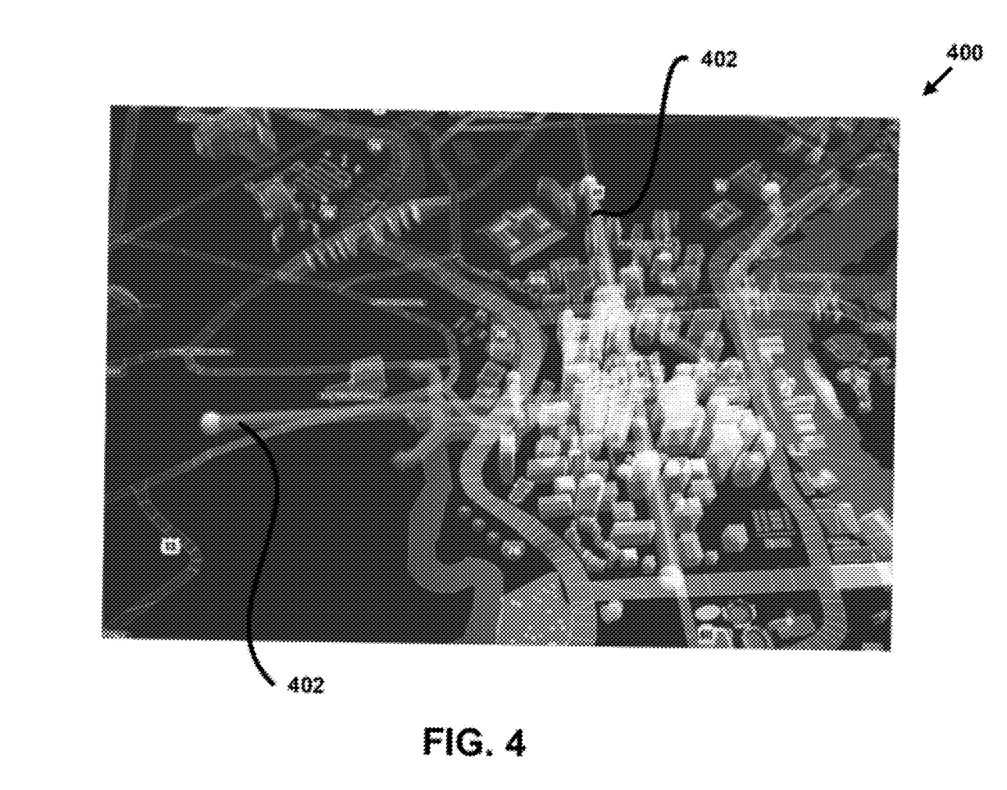
FIG. 4 is a screen shot depicting a Skyview with a transit network, according to an example.

FIG. 4 is screen shot 400 depicting a Skyview with a transit network 402. The transit network 402 is highlighted in the view by adding color or another visual effect to the transit network 402. For example, the Chicago Transit Authority (CTA) red line may be red, the CTA blue line may be blue, the CTA orange line may be orange, and so on. The colors of the transit lines are easily seen in the screen shot 400 as the surrounding city structures are in x-ray mode. As the traffic report continues, the surrounding city structures may eventually fade away, leaving only the transit network 402 visible.

Figure 5:
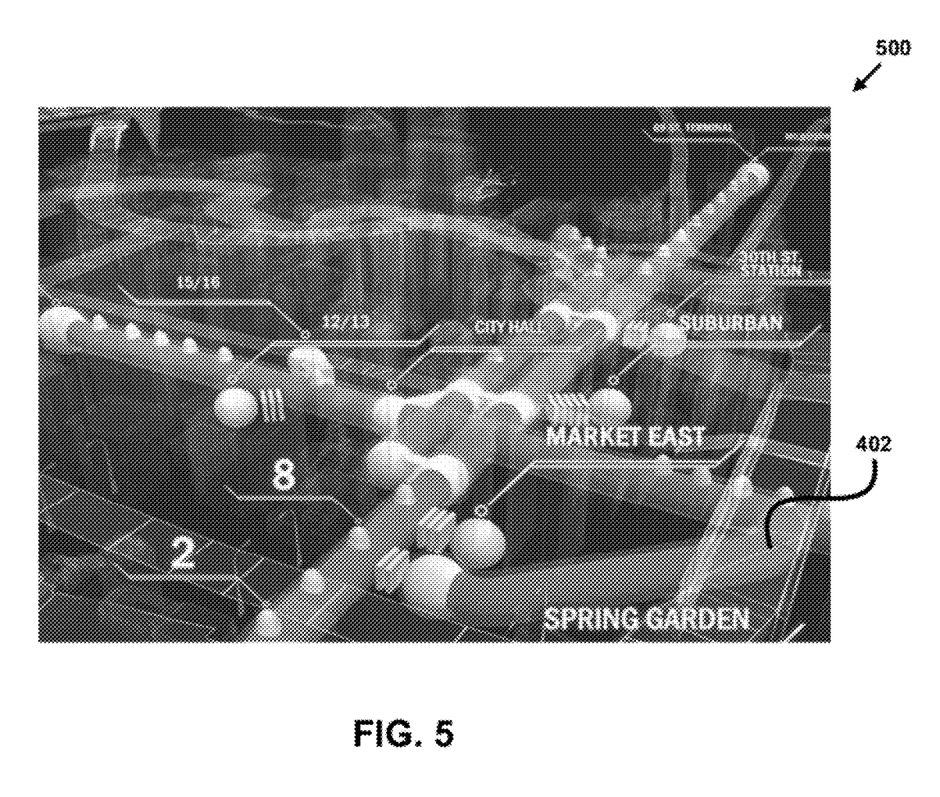
FIG. 5 is a screen shot depicting a portion of the Skyview depicted in FIG. 4 with transit stop names added, according to an example.

FIG. 5 is screen shot 500 depicting a portion of the transit network 402. In the screen shot 500, the surrounding city structures are removed or barely visible leaving the transit network 402 clearly visible. In addition, the camera angle has changed to provide a close-up view of a particular portion of the transit network 402. In one example, the camera is represented using the Gamebryo perspective camera model, which takes the camera's position, viewing point, and normal vector as input. These inputs may be initially specified by the artist, however, the default camera positions and viewpoint may be overridden by the user. For example, a television producer may rotate and tilt the view of the transit network 402 for a desired presentation.

The screen shot 500 also depicts static objects that identify the transit stations and switch locations. Other static objects may also be added to the traffic report to assist a viewer in recognizing the location described in the traffic report. For example, the transit agency logo may be added to the traffic report.

The traffic report may also include graphics for dynamic objects. Unlike the static objects, the dynamic objects present data that can change during a traffic report. The dynamic objects are designed to receive a particular type of data, such as vehicle speed or travel times. During the traffic report, as the data driving the dynamic object changes, the data presented by the dynamic object changes. For example, a dynamic object depicting a transit delay may show the delay time increase or decrease as the traffic report is presented.

The static and dynamic object graphics added to the traffic report are pre-coded in the traffic report application 104. This code defines how an object appears in the traffic report when a television producer or other user selects a transit incident to include in a traffic report. The traffic report application 104 selects the graphics for the transit incident, including the object graphics, and sends a video output signal to the television station 106 for use in its traffic report.

Figure 6:
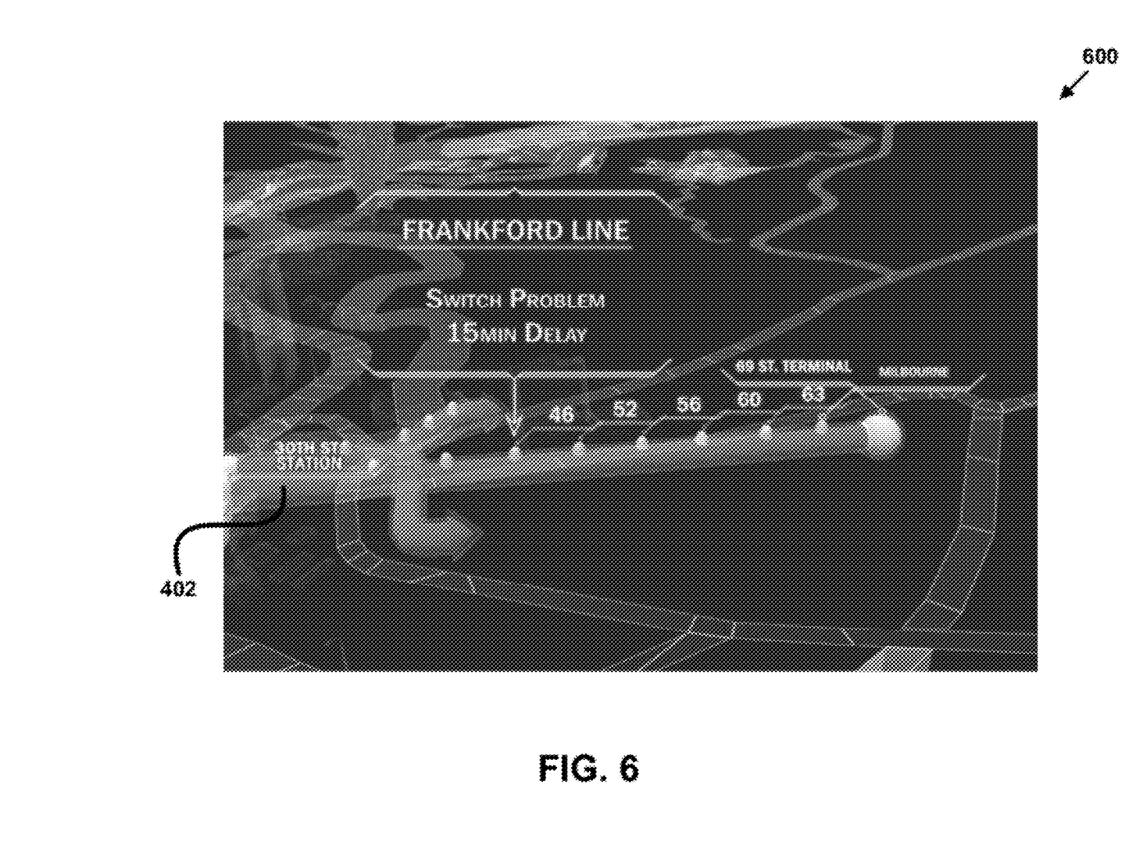
FIG. 6 is a screen shot depicting a portion of the Skyview depicted in FIG. 4 identifying an incident in a transit network, according to an example.

FIG. 6 is screen shot 600 depicting the transit network 402 with the camera angle zoomed to view a particular portion of the transit network 402 experiencing a transit incident. In this example, the Frankford line is experiencing a 15 minute delay due to a switch problem. A graphic object is added to the traffic report to provide information regarding the incident to the viewers.

The user can select a rundown of views to show in a traffic report. A rundown is a list of views that a user would like to present to a viewer of the traffic report. The list of views may include a combination of 2D and 3D views of the transit system. The traffic report moves from view to view using smooth, seamless transitions.

For example, the user may select the transit network 402 and select a series of views, such as those depicted in FIGS. 2-6. In this example, the rundown may include a city view, followed by the city view in x-ray mode, followed by a view of the transit network with transparent landmarks, followed by a fly-through of a transit line in the transit network, followed by a zoomed-in view of the incident location on the transit line. When the traffic report is displayed by the television station 106, a web-based application, or a cellular-based application, a viewer of the traffic report receives information regarding both the location of the transit network in the real world and the current conditions on the transit network.

Figure 7:
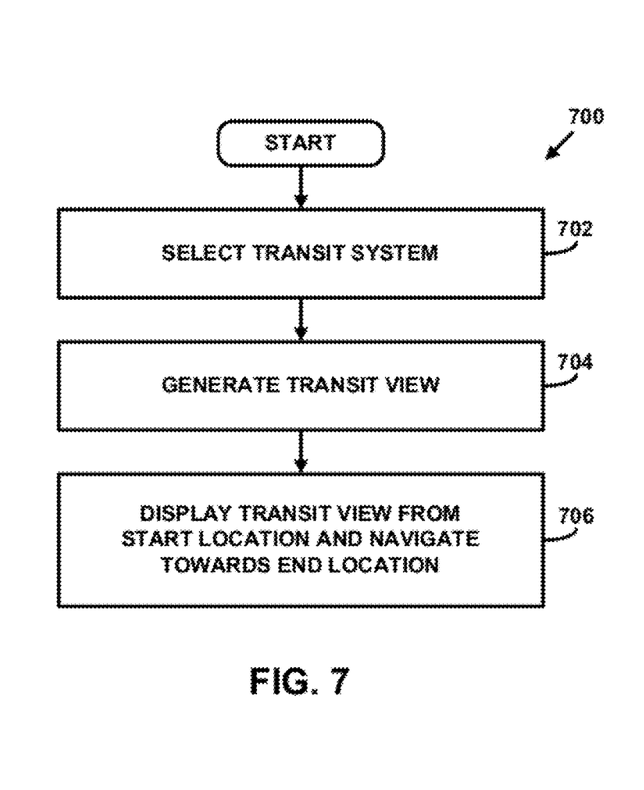
FIG. 7 is a flow chart of a method of displaying a transit view, according to an example.

FIG. 7 is a flow chart of a method 700 for displaying a transit view. At block 702, a user selects a transit system to include in the traffic report. The user may also select a starting point and an end point in the transit system to include in the report.

At block 704, the traffic report application 104 generates the transit view. For the selected transit system, the traffic report application 104 obtains the transit condition data from the traffic data collection center 102. The traffic report application 104 uses the transit condition data to evaluate the status of the transit system. The traffic report application 104 generates the transit view by combining the geographical map and the status of the transit system.

At block 706, the television station 106, a web-based application, a cellular application, or other system displays the transit view from the start point, navigating towards the end point. The user can adjust the start point and end points to allow for full or partial coverage of the selected transit system. The user can also stop the view at a point between the start point and the end point. As a result, the user has multiple options of showing the transit conditions on the transit system.

The transit view may be included in a traffic report that also includes current traffic conditions. Additionally or alternatively, the traffic report may include views for more than one transit system. For example, a traffic report for a city may include current conditions for a bus system, a subway system, and a commuter train system. As a result, a traffic report provides a unique "one-world" presentation of incidents in a geographic area.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method of displaying transit conditions in a traffic report that includes a visual depiction of a geographical area, comprising in combination:
    selecting a transit system and a road system, wherein the transit system includes transit conditions and wherein the road system includes traffic conditions;
    determining a transit condition on the transit system, wherein the transit condition includes a status of the transit system;
    determining a traffic condition on the road system;
    displaying a three dimensional virtual world view of the transit system and the road system such that the three dimensional virtual world view emphasizes the transit system within the geographic area by making structures near the transit system more transparent in the three dimensional virtual world view; and
    displaying the transit condition along the transit system and the traffic condition along the road system in the three dimensional virtual world view.

2. The method of claim 1, wherein the transit system is one of a train system and a ferry system.

3. The method of claim 1, further comprising creating transit system graphics using a scene graph.

4. The method of claim 1, wherein determining a transit condition of the transit system includes obtaining the transit condition from a transit agency.

5. The method of claim 1, wherein determining a transit condition of the transit system includes obtaining data from sensors.

6. The method of claim 1, wherein making structures near the transit system more transparent in the three dimensional virtual world view includes changing textures of the structure graphics.

7. The method of claim 1, wherein the three dimensional virtual world view emphasizes the transit system by adding color to the transit system graphics.

8. The method of claim 1, wherein the three dimensional virtual world view of the transit conditions includes a graphic object that identifies an incident on the transit system.

9. A system for providing a transit view for a traffic report that includes a visual depiction of a geographical area, comprising:
    a data collection center configured to receive data regarding transit conditions on at least one transit system and traffic conditions on at least one road system, wherein the data collection center is configured to generate a condition data output; and
    a non-transitory computer readable medium executable by a processor to execute a traffic report application configured to receive the condition data output from the data collection center and configured to generate a video output for a traffic report including a three dimensional virtual world view of the transit conditions and traffic conditions that minimizes visual obstructions from landmarks near the transit system in the three dimensional virtual world view.

10. The system of claim 9, wherein the data collection center receives data regarding transit conditions from an operator that enters data into the data collection center.

11. The system of claim 9, wherein the data collection center receives data regarding transit conditions from sensors.

12. The system of claim 9, wherein the video output includes a run down of views including the view of transit conditions.

13. The system of claim 12, wherein the rundown further includes a view of traffic conditions.

14. The system of claim 9, wherein the three dimensional virtual world view minimizes visual obstructions by making the landmark graphics appear more transparent than the transit system graphics in the three dimensional virtual world view.

15. A method of displaying transit conditions in a traffic report that includes a visual depiction of a geographical area, comprising in combination:
    creating a geographical map of a geographic area including a transit system and a road system;
    creating a three dimensional virtual world view depicting the transit system, the road system, and other features in the geographical area, wherein the three dimensional virtual world view highlights the transit system by de-emphasizing the other features in the geographic area;
    obtaining data representing transit conditions on the transit system and data representing traffic conditions on the road system; and
    using the geographical map, the three dimensional virtual world view, the data representing traffic conditions and the data representing transit conditions in a visual traffic report.

16. The method of claim 15, wherein creating the geographical map includes adding a transit layer to a scene file.

17. The method of claim 16, further comprising creating transit system graphics using a scene graph.

18. The method of claim 15, wherein creating the three dimensional virtual world view includes changing textures of the other feature graphics to make the features more transparent in the three dimensional virtual world view.

19. The method of claim 15, wherein creating the three dimensional virtual world view includes adding color to the transit system graphics.

* * * * *